United States Patent
Shelton et al.

(10) Patent No.: US 10,768,297 B2
(45) Date of Patent: Sep. 8, 2020

(54) TRAFFIC RADAR SYSTEM WITH MULTIPLE ZONE TARGET DETECTION

(71) Applicant: Kustom Signals, Inc., Lenexa, KS (US)

(72) Inventors: Maurice Shelton, Buffalo, KS (US); Mike Bietsch, Nevada, MO (US); Michael Paulson, Lawrence, KS (US)

(73) Assignee: Kustom Signals, Inc., Lenexa, KS (US)

( * ) Notice: Subject to any disclaimer, the term of this patent is extended or adjusted under 35 U.S.C. 154(b) by 197 days.

(21) Appl. No.: 16/137,004

(22) Filed: Sep. 20, 2018

(65) Prior Publication Data

US 2019/0107618 A1    Apr. 11, 2019

Related U.S. Application Data

(60) Provisional application No. 62/569,667, filed on Oct. 9, 2017, provisional application No. 62/569,923, filed
(Continued)

(51) Int. Cl.
| | |
|---|---|
| *G01S 13/92* | (2006.01) |
| *G01S 7/04* | (2006.01) |
| *G01S 13/87* | (2006.01) |
| *G01S 7/40* | (2006.01) |
| *G01S 13/58* | (2006.01) |
| *G01S 7/288* | (2006.01) |
| *G01S 13/931* | (2020.01) |

(52) U.S. Cl.
CPC .............. *G01S 13/92* (2013.01); *G01S 7/04* (2013.01); *G01S 7/288* (2013.01); *G01S 7/4052* (2013.01); *G01S 13/58* (2013.01); *G01S 13/87* (2013.01); *G01S 2007/2883* (2013.01); *G01S 2007/4082* (2013.01); *G01S 2013/932* (2020.01)

(58) Field of Classification Search
CPC .......... G01S 13/92; G01S 13/58; G01S 13/87; G01S 7/04; G01S 7/288; G01S 7/4052; G01S 11/10; G01S 11/02; G01S 11/026; G01C 21/165; G01P 3/60
USPC ........................................................ 342/461
See application file for complete search history.

(56) References Cited

U.S. PATENT DOCUMENTS

| | | | | |
|---|---|---|---|---|
| 6,198,427 B1 * | 3/2001 | Aker | ......................... | G01S 7/04 342/104 |
| 7,038,614 B1 * | 5/2006 | Aker | ..................... | G01S 13/583 342/70 |

(Continued)

*Primary Examiner* — Harry K Liu
(74) *Attorney, Agent, or Firm* — Hovey Williams LLP

(57) ABSTRACT

A traffic radar system comprises a first radar transceiver assembly, a second radar transceiver assembly, a display, and a processing element. The first radar transceiver assembly transmits and receives radar beams and generates a first electronic signal corresponding to the received radar beam. The second radar transceiver assembly transmits and receives radar beams and generates a second electronic signal corresponding to the received radar beam. The display displays a plurality of speeds, each speed being a speed of a target vehicle. The processing element is configured to receive the first and second electronic signals, process the first electronic signal to determine speeds of target vehicles in the front zone, process the second electronic signal to determine speeds of target vehicles in the rear zone, and control the display to display the speeds of target vehicles in the front zone or target vehicles in the rear zone based on predetermined parameters.

17 Claims, 8 Drawing Sheets

Related U.S. Application Data on Oct. 9, 2017, provisional application No. 62/570,446, filed on Oct. 10, 2017.

(56) References Cited

U.S. PATENT DOCUMENTS

| | | | | |
|---|---|---|---|---|
| 2005/0253749 | A1* | 11/2005 | Shelton | G01S 7/4021 342/104 |
| 2013/0307984 | A1* | 11/2013 | Pan | G09F 23/00 348/148 |
| 2015/0219758 | A1* | 8/2015 | Gammenthaler | G08G 1/04 382/103 |
| 2016/0103218 | A1* | 4/2016 | Mandava | G01S 13/931 701/301 |

* cited by examiner

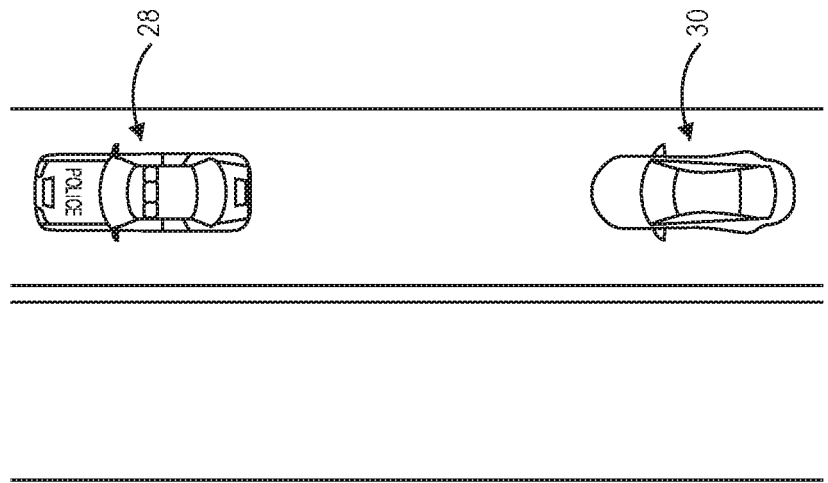
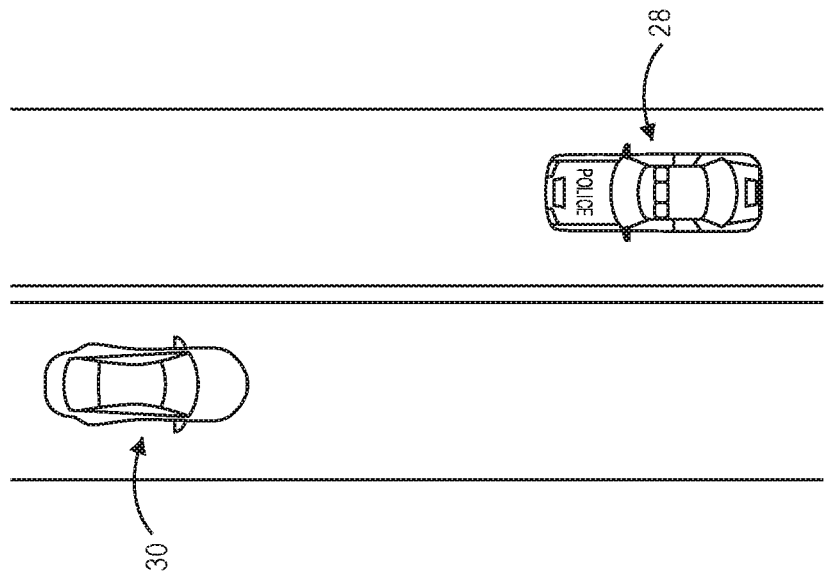

TRAFFIC RADAR SYSTEM WITH MULTIPLE ZONE TARGET DETECTION

RELATED APPLICATIONS

The current patent application is a non-provisional application which claims priority benefit to U.S. Provisional Application No. 62/569,667, entitled "TRAFFIC RADAR SYSTEM WITH MULTIPLE ZONE TARGET DETECTION", and filed Oct. 9, 2017; U.S. Provisional Application No. 62/569,923, entitled "GPS ASSISTED PATROL SPEED SEARCH FOR DSP TRAFFIC RADAR", and filed Oct. 9, 2017; and U.S. Provisional Application No. 62/570,446, entitled "TRAFFIC RADAR SYSTEM WITH ELECTRONIC TUNING FORK TEST FEATURE", and filed Oct. 10, 2017. The earlier-filed provisional applications are hereby incorporated by reference in their entireties into the current application.

BACKGROUND OF THE INVENTION

Field of the Invention

Embodiments of the current invention relate to radar systems used to determine target vehicle speeds.

Description of the Related Art

Traffic radio and ranging (radar) systems typically include at least one radar transceiver that transmits a radar beam and receives reflections of the radar beam as it bounces off of target vehicles in a zone. The received reflections of the radar beam are converted to an electronic signal which is processed to determine the speeds of the target vehicles, which may then be displayed on a display. When multiple zones are monitored, prior art traffic radar systems have required the operator to manually select the zone from which speeds are displayed, possibly missing a target vehicle exceeding the speed limit in a zone that is not being monitored. Other prior art traffic radar systems may include multiple displays, with each display displaying speeds of target vehicles in a separate zone. The drawback to having multiple displays is the confusion over which display is displaying speeds of target vehicles from which zone.

SUMMARY OF THE INVENTION

Embodiments of the current invention solve the above-mentioned problems and provide a distinct advance in the art of traffic radar systems. An exemplary traffic radar system may scan multiple zones and automatically display the speeds of target vehicles based on predetermined parameters.

The traffic radar system comprises a first radar transceiver assembly, a second radar transceiver assembly, a display, and a processing element. The first radar transceiver assembly is configured to transmit and receive radar beams from a front zone corresponding to area in front of a patrol vehicle. The first radar transceiver assembly is further configured to generate a first electronic signal corresponding to the received radar beam. The second radar transceiver assembly is configured to transmit and receive radar beams from a rear zone corresponding to area behind the patrol vehicle. The second radar transceiver assembly is further configured to generate a second electronic signal corresponding to the received radar beam. The display is configured to display a plurality of speeds, with each speed being a speed of a target vehicle. The processing element is configured to receive the first and second electronic signals, process the first electronic signal to determine speeds of one or more target vehicles in the front zone, process the second electronic signal to determine speeds of one or more target vehicles in the rear zone, and control the display to display the speeds of one or more target vehicles in the front zone or one or more target vehicles in the rear zone based on predetermined parameters.

Another embodiment of the current invention provides a traffic radar system comprising a first radar transceiver assembly, a second radar transceiver assembly, a display, an analog to digital converter, and a processing element. The first radar transceiver assembly is configured to transmit and receive radar beams from a front zone corresponding to area in front of a patrol vehicle. The first radar transceiver assembly is further configured to generate a first electronic signal corresponding to the received radar beam. The second radar transceiver assembly is configured to transmit and receive radar beams from a rear zone corresponding to area behind the patrol vehicle. The second radar transceiver assembly is further configured to generate a second electronic signal corresponding to the received radar beam. The display is configured to display a plurality of speeds, with each speed being a speed of a target vehicle. The analog to digital converter is configured to receive the first electronic signal and the second electronic signal and output a plurality of front radar digital data samples and a plurality of rear radar digital samples. The processing element is configured to receive the front radar digital data samples and the rear radar digital data samples, perform a time domain to frequency domain conversion on the front radar digital data samples to determine speeds of one or more target vehicles in the front zone, perform a time domain to frequency domain conversion on the rear radar digital data samples to determine speeds of one or more target vehicles in the rear zone, and control the display to display the speeds of one or more target vehicles in the front zone or one or more target vehicles in the rear zone based on predetermined parameters.

Yet another embodiment of the current invention provides a computer-implemented method for displaying speeds of target vehicles. The method comprises buffering a plurality of front radar digital data samples; processing the front radar digital data samples to determine speeds of one or more target vehicles in a front zone corresponding to area in front of a patrol vehicle; buffering a plurality of rear radar digital data samples; processing the rear radar digital data samples to determine speeds of one or more target vehicles in a rear zone corresponding to area behind the patrol vehicle; comparing the speeds of one or more target vehicles in the front zone with the speeds of one or more target vehicles in the rear zone; and displaying the speeds of one or more target vehicles in the front zone or one or more target vehicles in the rear zone based on predetermined parameters.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 5 is a top view of the patrol vehicle and a target vehicle in the front zone;

FIG. 6 is a top view of the patrol vehicle and a target vehicle in the rear zone;

Figure 1:
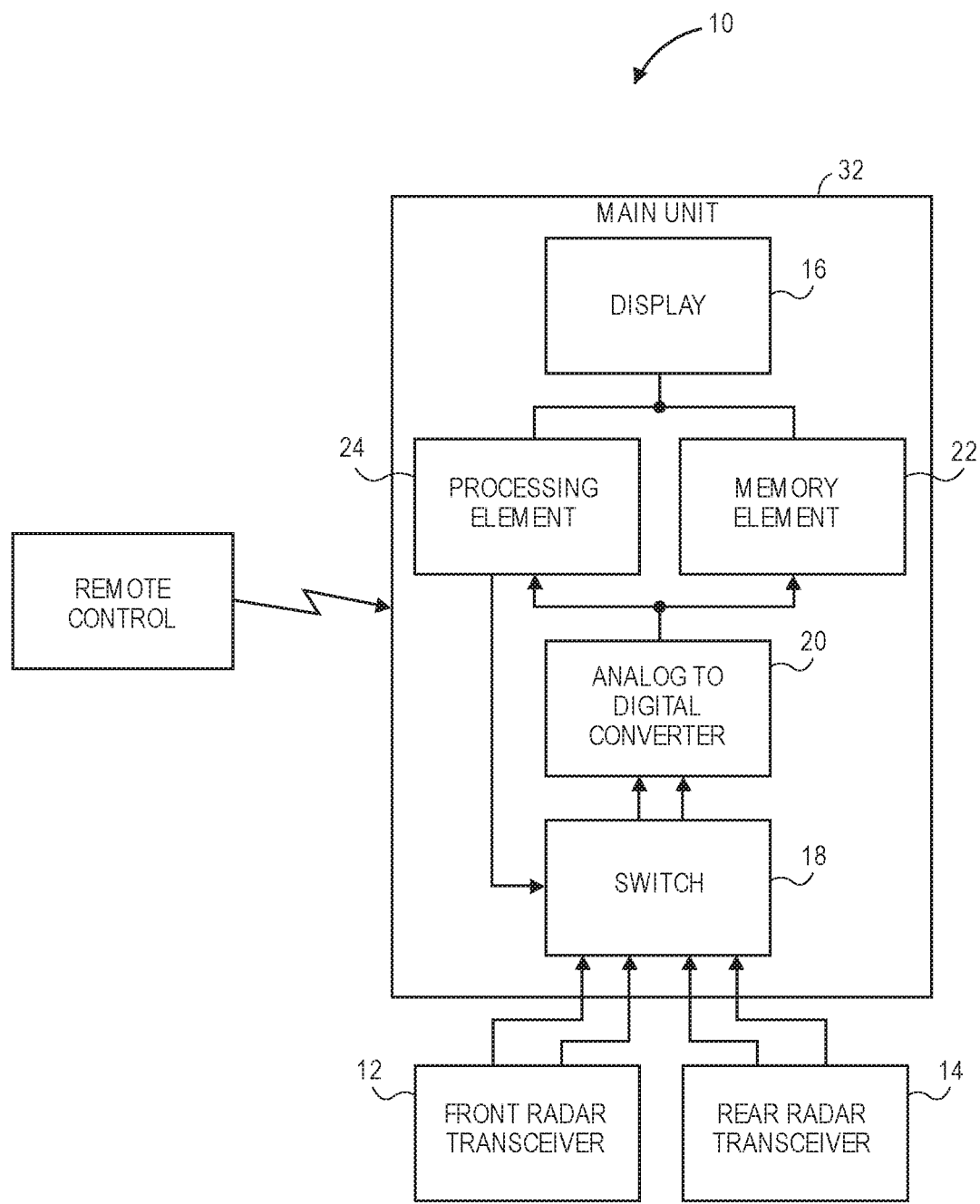
FIG. 1 is a schematic block diagram illustrating electronic components of a traffic radar system, constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
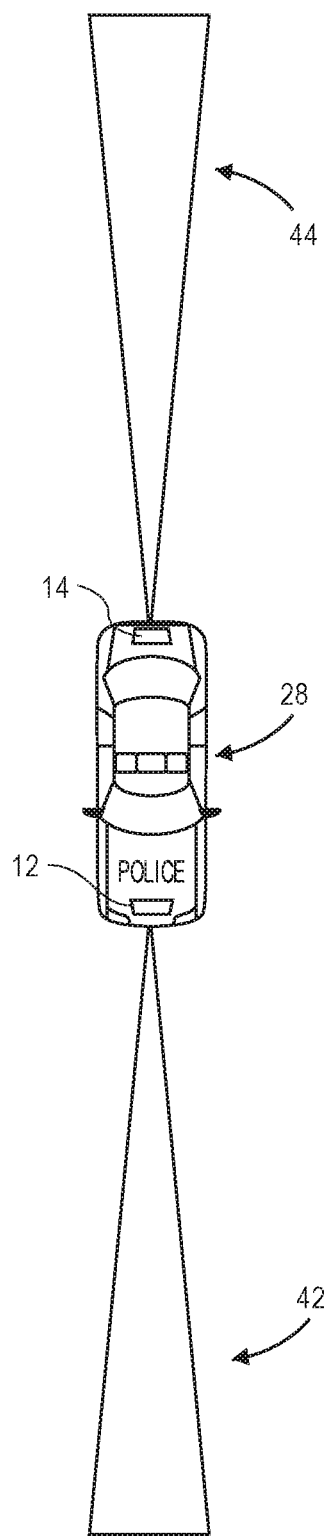
FIG. 2 is a top view of a law enforcement patrol vehicle equipped with the traffic radar system, the traffic radar system including a front radar transceiver assembly generating a first radar beam and a rear radar transceiver assembly generating a second radar beam.

Referring to FIGS. 1 and 2, a traffic radar system 10, constructed in accordance with various embodiments of the current invention, broadly comprises a front radar transceiver 12, a rear radar transceiver 14, a display 16, a switch 18, an analog-to-digital converter (ADC) 20, a memory element 22, a processing element 24, and a remote control 26. The traffic radar system 10 is typically installed in or on a law enforcement patrol vehicle 28 and is utilized to monitor the speeds of (target) vehicles 30 on a roadway.

The display 16, the switch 18, the ADC 20, the memory element 22, and the processing element 24 generally form a main unit 32. The main unit 32 may include additional components not shown in the figures and not discussed in greater detail. The additional components may include a housing to retain the electronic circuits, a communication element to provide wired or wireless communication with other devices, a user interface to allow users to operate the system 10, and so forth. The housing may also include a mount or hardware to mount the main unit 32 in or on the vehicle dashboard or center console.

Figure 3:
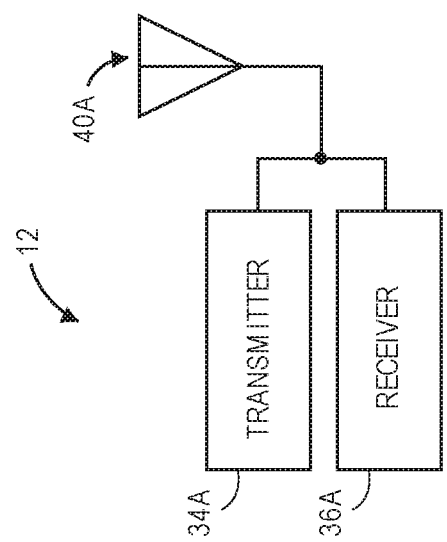
FIG. 3 is a schematic block diagram illustrating electronic components of the front radar transceiver assembly.

The front radar transceiver 12 generally transmits and receives radio frequency (RF) electromagnetic radiation for a radio detection and ranging (radar) application. The front radar transceiver 12 may include a transmitter 34A, a receiver 36A, and an antenna 40A, as shown in FIG. 3. The transmitter 34A may include electronic signal transmitting circuits, such as oscillators, mixers, frequency multipliers, filters, amplifiers, impedance matchers, and the like. The transmitter 34A generates a first RF electronic signal with an exemplary frequency of approximately 35.5 gigahertz (GHz), which is in the Ka band of radar frequency band classification. The transmitter 34A may receive a signal or data input that triggers it to generates the first RF electronic signal. Or, the transmitter 34A may generate the first RF electronic signal on a regular, periodic basis.

The receiver 36A may include electronic signal receiving circuits, such as oscillators, mixers, matched filters, amplifiers, and the like. The receiver 36A may receive a second RF electronic signal that includes reflection data resulting from reflections of a radar beam off of objects in the vicinity of the front radar transceiver 12. The receiver 36A may generate a front radar output electronic signal that has a lower frequency and still includes the reflection data. In various embodiments, the front radar output electronic signal has a dual complex or quadrature (I/Q) format. The front radar output electronic signal is communicated to the main unit 32.

The antenna 40A generally transmits a first radar beam 42 and receives reflections of the radar beam 42. When the antenna 40A receives the first RF electronic signal from the transmitter 34A, it transmits the first radar beam 42, that is, radio wave electromagnetic radiation forming the radar beam having an exemplary frequency of approximately 35.5 GHz. When the antenna 40A receives reflections of the first radar beam 42, it generates the second RF electronic signal. The antenna 40A may be embodied by directional antennas such as a parabolic antennas. The antenna 40A may transmit the first radar beam 42 as shown in FIG. 2, wherein the first radar beam 42 may have a width of approximately 12 degrees. The front radar transceiver 12 may be mounted inside the vehicle facing forward or installed on the forward portion of the patrol vehicle, such as a hood, a grill, or a front bumper of the vehicle. Thus, the first radar beam 42 is transmitted in front of the patrol vehicle.

Figure 4:
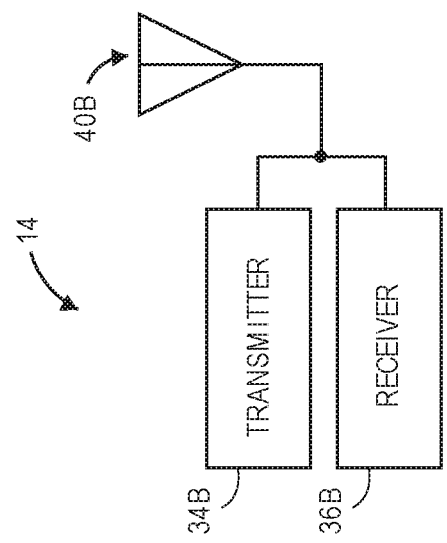
FIG. 4 is a schematic block diagram illustrating electronic components of the rear radar transceiver assembly.

Referring to FIG. 4, the rear radar transceiver 14 includes a transmitter 34B, a receiver 36B, and an antenna 40B, each of which is substantially identical in structure and function to the like-named components described above for the front radar transceiver 12. The antenna 40B may transmit a second radar beam 44 as shown in FIG. 2, wherein the second radar beam 44 may also have a width of approximately 12 degrees. The receiver 36B may generate a rear radar output electronic signal that varies according to reflections of the second radar beam 44 received by the antenna 40B. In various embodiments, the rear radar output electronic signal has a dual complex or quadrature (I/Q) format. The rear radar output electronic signal is communicated to the main unit 32. The rear radar transceiver 14 may be mounted inside the vehicle facing rearward or installed on the rear portion of the patrol vehicle, such as a trunk cover or a rear bumper of the vehicle. Thus, the second radar beam 44 is transmitted in the rear of the patrol vehicle.

The display 16 may include video devices of the following types: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, plasma, heads-up displays (HUDs), or the like, or combinations thereof. The display 16 may include a screen on which the information is presented, with the screen possessing a square or a rectangular aspect ratio that may be viewed in either a landscape or a portrait mode. In various embodiments, the display 16 may also include a touch screen occupying the entire screen or a portion thereof so that the display 16 functions as part of a user interface. The touch screen may allow the user to interact with the main unit 32 by physically touching, swiping, or gesturing on areas of the screen.

The switch 18 may have a double pole, double throw (DPDT) configuration with a first pair of input contacts, a second pair of input contacts, and a pair of output contacts. The first input contacts are electrically connected to the front radar transceiver 12 and receive the front radar output electronic signal. The second input contacts are electrically connected to the rear radar transceiver 14 and receive the rear radar output electronic signal. The output contacts may be electrically connected to the ADC 20. The switch 18 may operate in one of two modes. In a first mode, the output contacts receive the front radar output electronic signal. In a second mode, the output contacts receive the rear radar output electronic signal. Selection of the mode is controlled by a switch control signal from the processing element 24.

The ADC 20 receives the front radar output electronic signal or the rear radar output electronic signal from the switch 18. The ADC 20 includes electronic circuitry that converts the analog electrical characteristics of the front radar output electronic signal or the rear radar output electronic signal to a corresponding stream of sampled digital data, which includes a plurality of samples, each sample representing a value of the signal. The ADC 20 communicates the sampled digital data stream of the front radar output electronic signal or the rear radar output electronic signal to the memory element 22, the processing element 24, or both.

The memory element 22 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element 24. The memory element 22 may include, or may constitute, a "computer-readable medium". The memory element 22 may store the instructions, code, code statements, code segments, software, firmware, programs, applications, apps, services, daemons, or the like that are executed by the processing element 24. The memory element 22 may also store data that is received by the processing element 24 or the device in which the processing element 24 is implemented. The processing element 24 may further store data or intermediate results generated during processing, calculations, and/or computations as well as data or final results after processing, calculations, and/or computations. In addition, the memory element 22 may store settings, data, documents, sound files, photographs, movies, images, databases, and the like.

The processing element 24 may comprise one or more processors. The processing element 24 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, code statements, software, firmware, programs, applications, apps, processes, services, daemons, or the like. The processing element 24 may also include hardware components such as registers, finite-state machines, sequential and combinational logic, and other electronic circuits that can perform the functions necessary for the operation of the current invention. In certain embodiments, the processing element 24 may include multiple computational components and functional blocks that are packaged separately but function as a single unit. The processing element 24 may be in electronic communication with the other electronic components through serial or parallel links that include universal busses, address busses, data busses, control lines, and the like. The processing element 24 may be operable, configured, or programmed to perform the following functions by utilizing hardware, software, firmware, or combinations thereof.

The traffic radar system 10 may be in electronic communication with one or more data systems of the patrol vehicle 28. For example, the traffic radar system 10 may be electrically connected to the CAN bus, the OBD-I, the OBD-II, or the like. Accordingly, the processing element 24 may receive operational data, such as vehicle speed, etc., from the patrol vehicle 28.

The main unit 32 operates in one of three modes—a front zone mode, a rear zone mode, and a scan mode. The mode is selected by a user, typically a law enforcement officer, who selects the mode from the user interface of the main unit 32.

In the front zone mode, the traffic radar system 10 determines the speeds of approaching target vehicles 30 in front of the patrol vehicle 28 (the "front zone"), as shown in FIG. 5. The processing element 24 outputs the switch control signal at a first level to set the switch 18 in the first mode such that the front radar output electronic signal is input to the ADC 20. Thus, the processing element 24 receives a front radar digital data stream from the ADC 20. The memory element 22 also receives the front radar digital data stream from the ADC 20 and buffers or stores the front radar digital data stream in a first array. The processing element 24 processes the front radar digital data stream in order to determine a speed or velocity of target vehicles 30 that are in the front zone. The data processing may involve converting a portion of the front radar digital data stream (i.e., a plurality of front radar digital data samples), which is time-domain data, from the time domain to a frequency domain by utilizing a discrete Fourier transform (DFT), a fast Fourier transform (FFT), or the like. In various embodiments, the portion of time-domain front radar digital data may correspond to a number of points of the Fourier transform, which is simply the number of time-domain front radar digital data samples received. In exemplary embodiments, a 1,024-point Fourier transform may be performed. Thus, 1,024 time-domain front radar digital data samples are received. (Other point value transforms are possible, wherein the point value is typically determined from $2^n$, such as 256, 512, etc.) The front radar digital data samples may include a plurality of frequency components, each one having a magnitude, that are revealed by the time domain to frequency domain conversion. The magnitude of each frequency component may vary according to a magnitude of the reflected radar beam from the target vehicles. Based on the frequency components of the converted front radar digital data stream, the processing element 24 determines the speed of each target vehicle 30 that is in the front zone. The processing element 24 controls the display 16 to display the determined speed of the fastest target vehicle 30, which is in other words, the determined speed with the greatest value. Other parameters or criteria may be used to decide which speed gets displayed. For example, the speed of the vehicle whose reflected radar beam has the greatest magnitude (also known as having the "strongest signal") may additionally or alternatively be displayed. The processing element 24 repeats the steps of buffering the time-domain front radar digital data, converting the portion of time-domain data to the frequency domain, determining the speeds of target vehicles 30, and displaying the determined speed of the fastest target vehicle 30 that is in the front zone. The processing element 24 may repeat these steps four or five times per second, or at a rate of 4-5 hertz (Hz). The processing element 24 further provides or generates Doppler audio output, received by a system speaker, that correlates to the speeds of the target vehicles 30 and the front zone. In addition, the processing element 24 controls the display 16 to display the speed of the patrol vehicle 28.

In the rear zone mode, the traffic radar system 10 determines the speeds of approaching target vehicles 30 to the rear of the patrol vehicle 28 (the "rear zone"), as shown in FIG. 6. The processing element 24 outputs the switch control signal at a second level to set the switch 18 in the second mode such that the rear radar output electronic signal is input to the ADC 20. Thus, the processing element 24 and the memory element 22 receive a rear radar digital data stream from the ADC 20. The memory element 22 also buffers or stores the rear radar digital data stream in a second array. The processing element 24 follows the same data processing steps mentioned above, except that rear radar digital data is being processed. Thus, the processing element 24 controls the display 16 to display the determined speed of the fastest target vehicle 30, the speed of the target vehicle 30 having the strongest signal, or both. The processing element 24 may repeat the steps for processing rear radar digital data at a rate of 4-5 Hz. The processing element 24 further provides or generates Doppler audio output that correlates to the speeds of the target vehicles 30 and the rear zone. In addition, the processing element 24 controls the display 16 to display the speed of the patrol vehicle 28.

In the scan mode, the traffic radar system 10 switches automatically and repeatedly between the front zone mode and the rear zone mode. The processing element 24 outputs the switch control signal to set the switch 18 in the first mode such that the front radar output electronic signal is input to the ADC 20. The processing element 24 and/or the memory element 22 receive the front radar digital data stream from the ADC 20 until a first portion of data, such as 1,024 front radar digital data samples, has been received. After the first portion of data has been received, the processing element 24 outputs the switch control signal to set the switch 18 in the second mode such that the rear radar output electronic signal is input to the ADC 20. The processing element 24 and/or the memory element 22 receive the rear radar digital data stream from the ADC 20 until a second portion of data, such as 1,024 rear radar digital data samples, has been received. After the second portion of data has been received, the processing element 24 continues to output the switch control signal in a toggling fashion to set the switch 18 in the first mode, followed by the second mode, and back again.

After the first portion of data has been received and while the second portion of data is being received, the processing element 24 processes the first portion of data as described above in order to determine the speeds of target vehicles 30 in the front zone. After the second portion of data has been received and while the first portion of data is being received again, the processing element 24 processes the second portion of data as described above in order to determine the speeds of target vehicles 30 in the rear zone. The processing element 24 controls the display 16 to display the speed of the target vehicle 30, either to the front (from the first portion of data) or to the rear (from the second portion of data) of the patrol vehicle 28, according to system parameters. The processing element 24 further provides or generates Doppler audio output that correlates to the speeds of the target vehicles 30 and the front or rear zone. The processing element 24 then repeats the data processing steps—processing the first portion of data, processing the second portion of data, displaying the speed of the target vehicle 30—at a rate of 4-5 Hz. In addition, the processing element 24 controls the display 16 to display the speed of the patrol vehicle 28.

Figure 7:
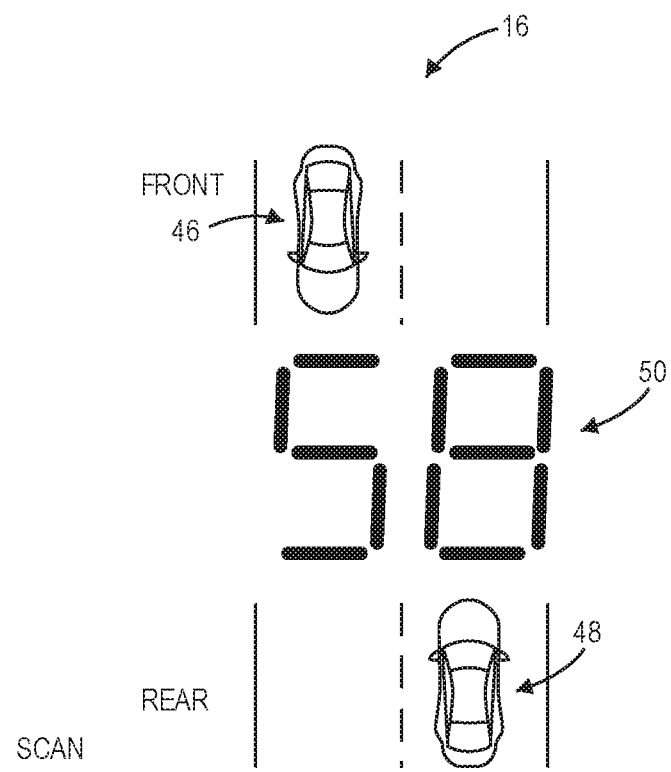
FIG. 7 is a view of a display of a main unit of the traffic radar system.

An example of a view of the display 16 in the scan mode is shown in FIG. 7. The display 16 includes a first vehicle representation 46, representing a target vehicle 30 approaching in the front zone, and a second vehicle representation 48, representing a target vehicle 30 approaching in the rear zone. In various embodiments, the first vehicle representation 46 may be presented in a first color, such as red, while the second vehicle representation 48 may be presented in a second color, such as blue. The display 16 further includes the labels "FRONT", indicating the front radar transceiver 12 is active, "REAR" indicating the rear radar transceiver 14 is active, and "SCAN" indicating that the main unit 32 is in the scan mode. In addition, the display 16 includes a first speed indication 50, which indicates the speed of the patrol vehicle 28 itself. In various embodiments, the first speed indication 50 may be presented in a third color, such as green.

Figure 8:
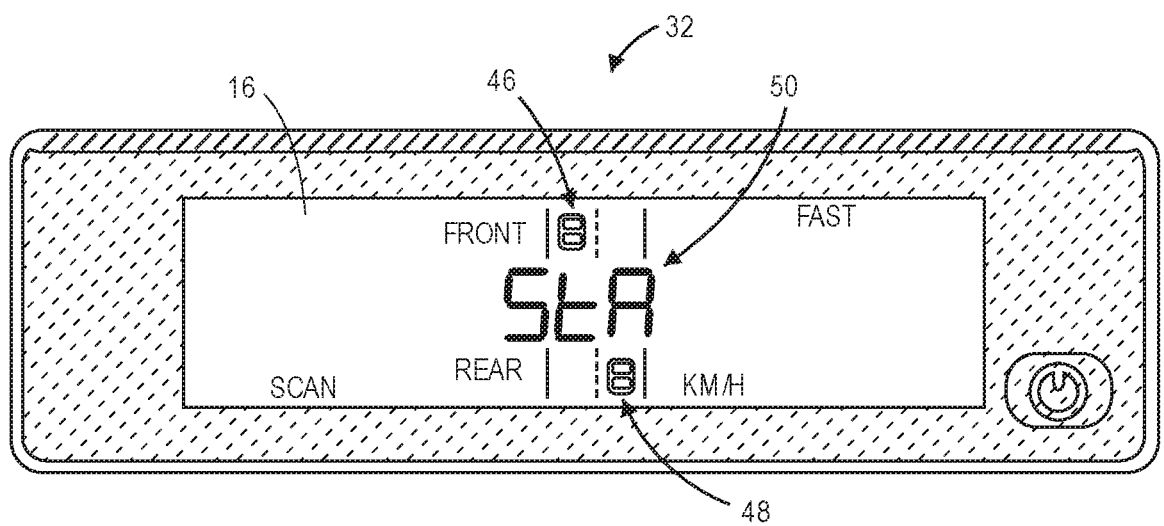
FIG. 8 is a front view of the main unit illustrating a first speed indication.

A first example of a view of the front of the main unit 32 is shown in FIG. 8. The front of the main unit 32 includes the display 16 with the same features discussed above for FIG. 7. In the first example, the first speed indication 50 has a value of "Sta", indicating that the patrol vehicle 28 is stationary.

Figure 9:
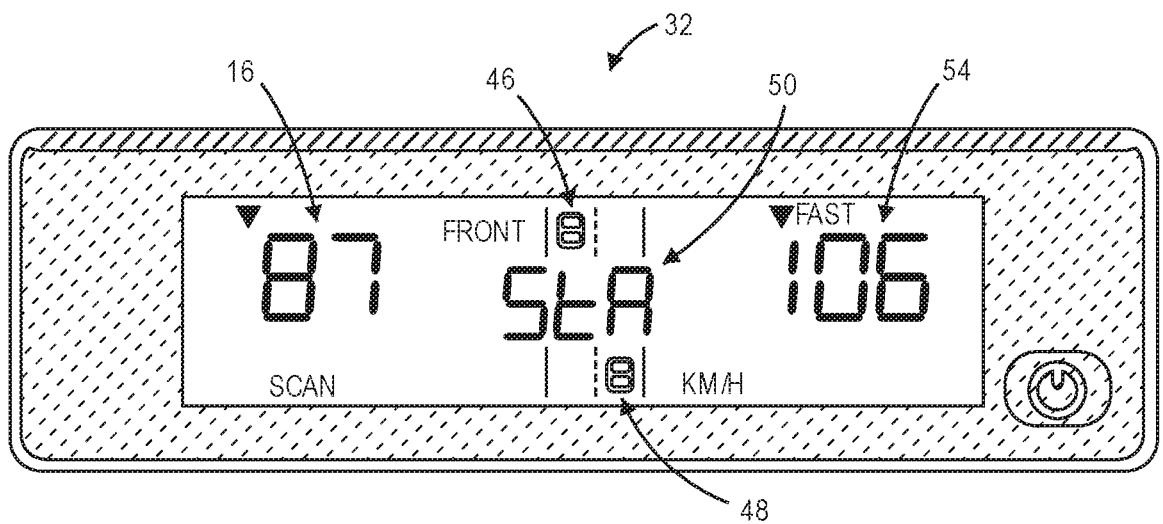
FIG. 9 is a front view of the main unit illustrating a second speed indication and a third speed indication, each speed indication showing a speed of a vehicle in the front zone.

A second example of a view of the front of the main unit 32 is shown in FIG. 9. The display 16 includes a second speed indication 52 positioned in the left half of the display 16, and a third speed indication 54 positioned in the right half of the display 16. In the second example, the second speed indication 52 is associated with the target vehicle 30 with the strongest signal, and the third speed indication 54 is associated with the target vehicle 30 having the greatest speed. Thus, the display 16 includes a "FAST" label in close proximity to the third speed indication 54. The FRONT label is displayed, indicating that the front radar transceiver 12 is active and that the speeds shown in the second speed indication 52 and the third speed indication 54 are from target vehicles 30 in the front zone. There is also a units label, indicating the units of the speeds shown in all of the speed indications. In the second example, the units label has a value of "KM/H", indicating that the speeds are in units of kilometers per hour. Furthermore, the second speed indication 52 and the third speed indication 54 are positioned closer to an upper edge of the display 16 to indicate that the speeds shown are from target vehicles 30 in the front zone. In addition, the display 16 includes one triangular arrow corresponding to each of the second speed indication 52 and the third speed indication 54 to indicate the direction of travel of the target vehicles 30 associated with the speed indications 52, 54. In the second example, the triangular arrows are pointed downward, indicating that the target vehicles 30 are approaching the patrol vehicle 28.

Figure 10:
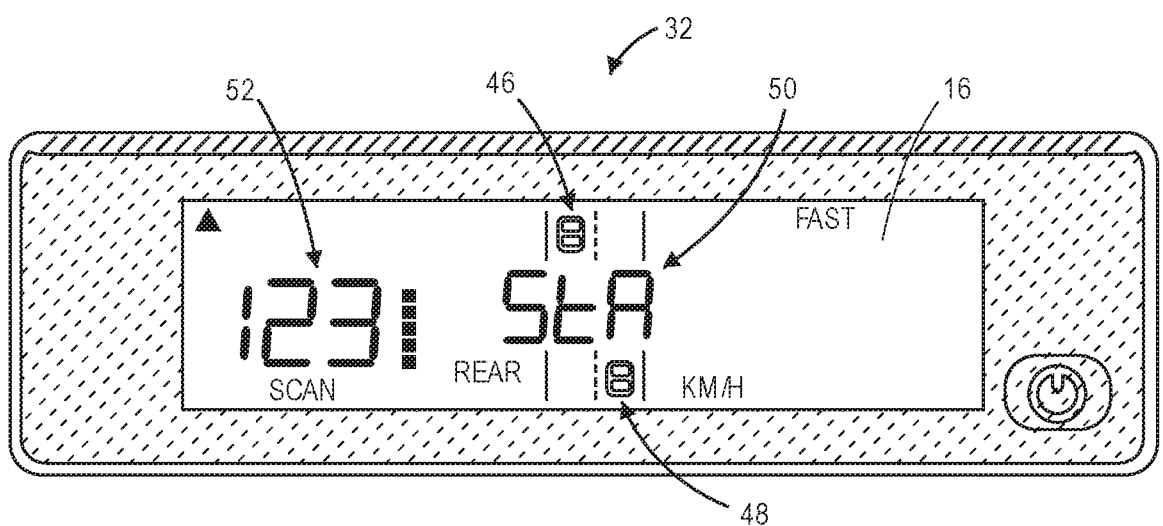
FIG. 10 is a front view of the main unit illustrating the second speed indication showing a speed of a vehicle in the rear zone.

A third example of a view of the front of the main unit 32 is shown in FIG. 10. In the third example, the second speed indication 52 is shown along with the REAR label to indicate a single target vehicle 30 in the rear zone. In addition, the second speed indication 52 is positioned closer to a lower edge of the display 16 to indicate that the speed shown is from a target vehicle 30 in the rear zone. Furthermore, the triangular arrows are pointed upward to indicate that the target vehicle 30 is approaching from the rear zone. The display 16 may also include a signal strength indicator, comprising a plurality of squares forming a dotted vertical line. The signal strength indicator varies in a positive correlation according to the magnitude of the radar beam reflected from a target vehicle 30. Generally, the greater the magnitude of the reflected radar beam, the greater the number of squares in the signal strength indicator.

Figure 11:
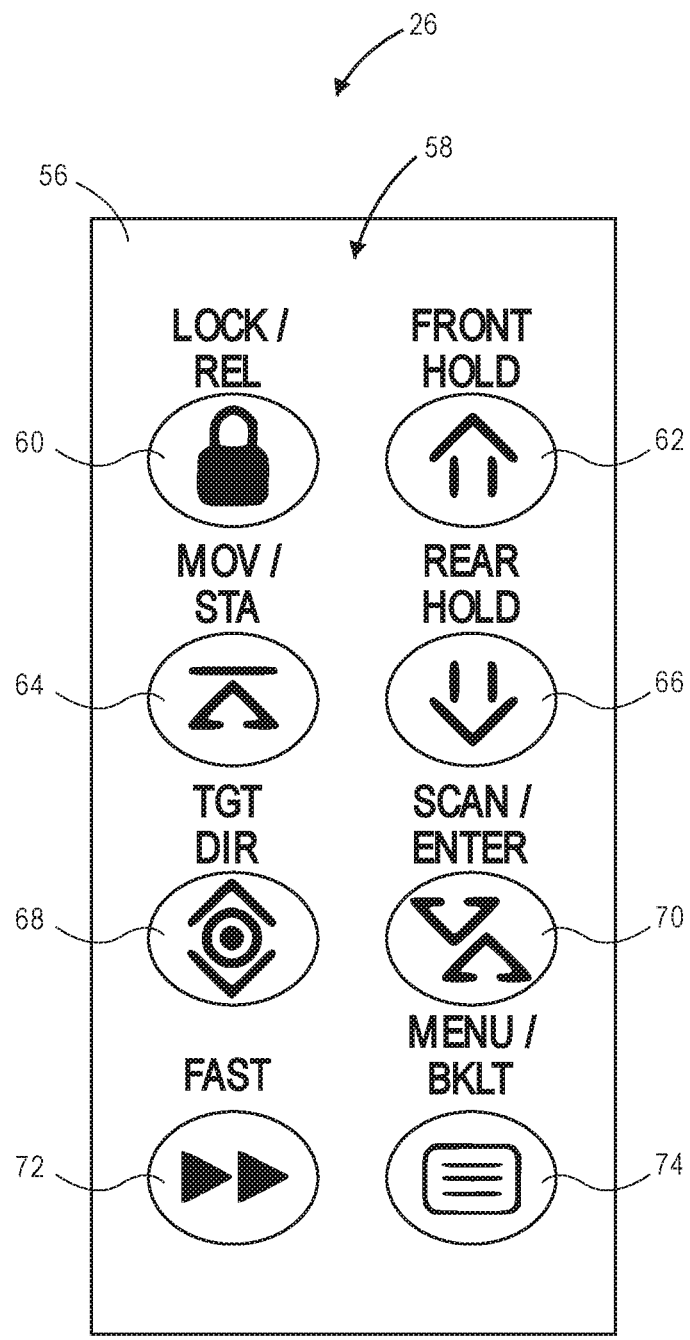
FIG. 11 is a front view of an interface of a remote control that interfaces with the main unit.

The remote control 26, as shown in FIG. 11, generally provides control of the operation of the traffic radar system 10. The remote control 26 may be packaged in a hand held package, may be mounted on the steering wheel or center console of the patrol vehicle 28, or may be implemented as a software application running on a mobile electronic device, such as a smart phone, a tablet computer, or the like. The remote control 26 may communicate with the main unit 32 through a wired cable connection or wirelessly through infrared (IR) signaling or radio frequency (RF) signaling, such as Bluetooth™, cellular, WiFi, etc. The remote control 26 includes an interface 56 with a plurality of functional icons 58, each functional icon 58 being selected to perform a particular function. Each functional icon 58 may be implemented as a pushbutton, a switch, or the like, or may be implemented as a touchscreen. A first functional icon 60 may lock or release the data that is displayed on the display 16. A second functional icon 62 may select the front zone mode. A third functional icon 64 may indicate to the main unit 32 whether the patrol vehicle 28 is moving or stationary. A fourth functional icon 66 may select the rear zone mode. A fifth functional icon 68 may select the target direction zone of interest, approaching or receding. A sixth functional icon 70 may select the scan mode. A seventh functional icon 72 may select the fastest vehicle mode of operation. An eighth functional icon 74 may bring up a menu of options or remote control 26 back lighting.

Figure 12:
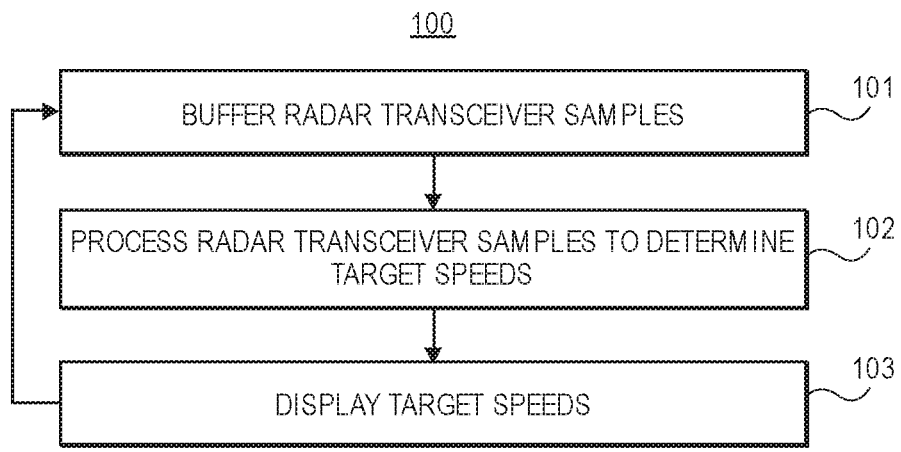
FIG. 12 is a listing of at least a portion of the steps of a computer-implemented method for displaying speeds of target vehicles.

FIG. 12 depicts a listing of at least a portion of the steps of an exemplary computer-implemented method 100 for displaying speeds of target vehicles 30 using a traffic radar system 10. The steps may be performed when the main unit 32 is in the front zone mode or the rear zone mode. The steps may be performed in the order shown in FIG. 12, or they may be performed in a different order. Furthermore, some steps may be performed concurrently as opposed to sequentially. In addition, some steps may be optional or may not be performed.

Referring to step 101, a plurality of radar transceiver samples are buffered. The radar transceiver samples are a stream of digital data samples that are received from the ADC 20, which converts either the (analog) front radar output electronic signal from the front radar transceiver 12 or the (analog) rear radar output electronic signal from the rear radar transceiver 14. The digital data samples are received by the processing element 24 and the memory element 22 which stores the digital data samples in an array.

Referring to step 102, the radar transceiver samples are processed to determine speeds of target vehicles 30. Once a certain amount of radar transceiver digital data samples, such as 1,024 samples, are received and stored in the memory element 22, the processing element 24 performs a time domain to frequency domain data conversion using a DFT, FFT, or the like. Based on the frequency components of the converted radar transceiver digital data samples, the processing element 24 determines the speed of each target vehicle 30 that is in the front zone, if the main unit 32 is in the front zone mode, or in the rear zone, if the main unit 32 is in the rear zone mode.

Referring to step 103, the speeds of the target vehicles 30 are displayed. As shown in FIG. 9, the speeds for two vehicles may be shown on the display 16. For example, the speed of a target vehicle 30 with the strongest signal may be shown in the second speed indication 52, and the speed of a target vehicle 30 having the greatest speed may be shown in the third speed indication 54.

After the completion of step 103, steps 101-103 may be repeated at a rate of 4-5 Hz.

Figure 13:
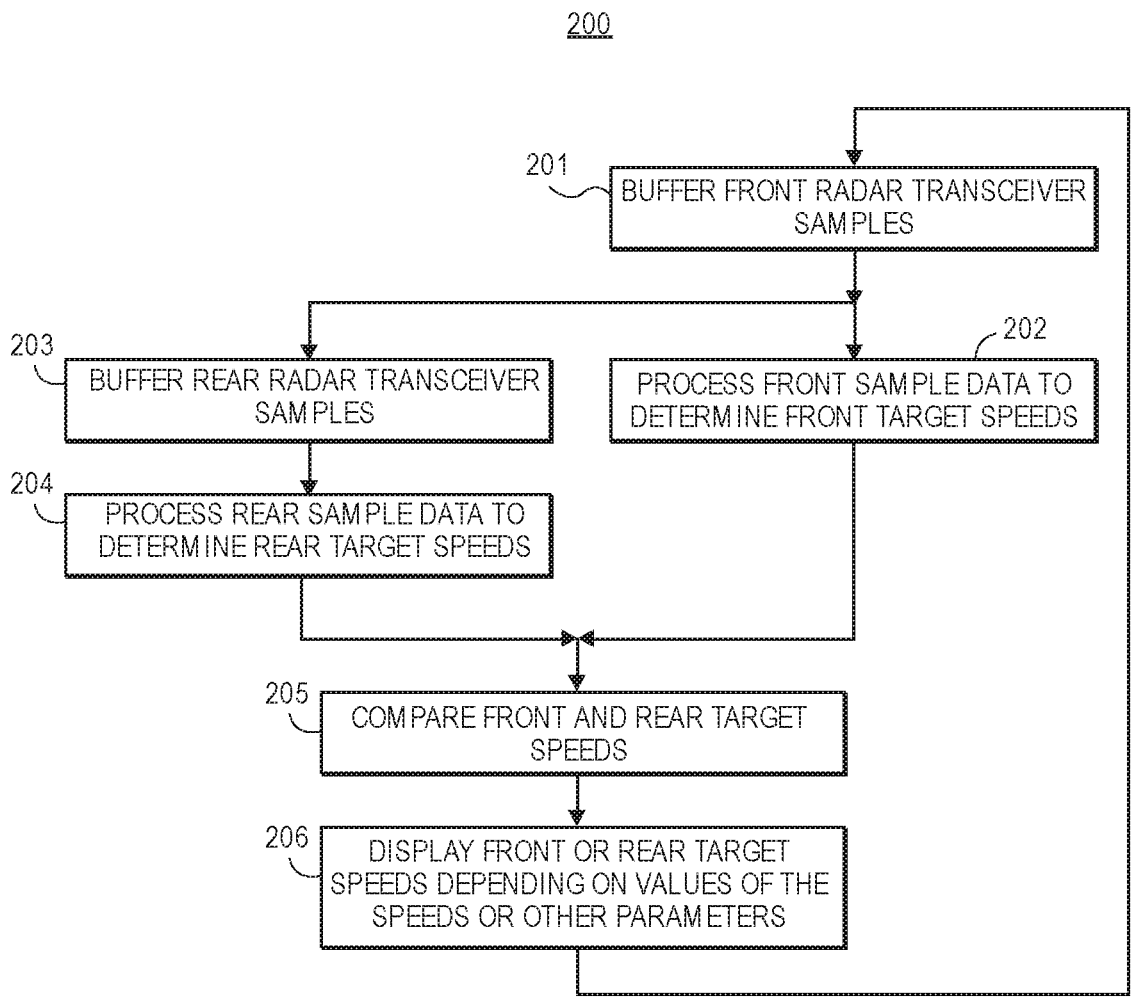
FIG. 13 is a listing of at least a portion of the steps of a computer-implemented method for displaying speeds of target vehicles in a scan mode.

FIG. 13 depicts a listing of at least a portion of the steps of an exemplary computer-implemented method 200 for displaying speeds of target vehicles 30 in a scan mode using a traffic radar system 10. The steps may be performed when the main unit 32 is in the scan mode. The steps may be performed in the order shown in FIG. 12, or they may be performed in a different order. Furthermore, some steps may be performed concurrently as opposed to sequentially. In addition, some steps may be optional or may not be performed.

Referring to step 201, a plurality of front radar transceiver samples are buffered. The front radar transceiver samples are a stream of digital data samples that are received from the ADC 20, which converts the (analog) front radar output electronic signal from the front radar transceiver 12. The front radar digital data samples are received by the processing element 24 and the memory element 22 which stores the front radar digital data samples in a first array.

Referring to step 202, the front radar transceiver samples are processed to determine speeds of target vehicles 30 in the front zone. Once a certain amount of front radar transceiver digital data samples, such as 1,024 samples, are received and stored in the memory element 22, the processing element 24 performs a time domain to frequency domain data conversion using a DFT, FFT, or the like. Based on the frequency components of the converted front radar transceiver digital data samples, the processing element 24 determines the speed of each target vehicle 30 that is in the front zone.

Referring to step 203, a plurality of rear radar transceiver samples are buffered. The rear radar transceiver samples are a stream of digital data samples that are received from the ADC 20, which converts the (analog) rear radar output electronic signal from the rear radar transceiver 14. The rear radar digital data samples are received by the processing element 24 and the memory element 22 which stores the rear radar digital data samples in a second array.

Referring to step 204, the rear radar transceiver samples are processed to determine speeds of target vehicles 30 in the rear zone. Once a certain amount of rear radar transceiver digital data samples, such as 1,024 samples, are received and stored in the memory element 22, the processing element 24 performs a time domain to frequency domain data conversion using a DFT, FFT, or the like. Based on the frequency components of the converted rear radar transceiver digital data samples, the processing element 24 determines the speed of each target vehicle 30 that is in the rear zone.

Referring to step 205, the speeds of the target vehicles 30 from the front zone and the rear zone are compared. In some embodiments, the fastest speed from the front zone may be compared with the fastest speed from the rear zone. In other embodiments, the speed associated with the target vehicle 30 having the strongest signal may be compared with the speed associated with the target vehicle 30 in the rear zone having the strongest signal. Or, the strongest signal in the front zone may be compared with the strongest signal in the rear zone. Alternatively, user-specified or system-default parameters of the speeds from the front zone and the rear zone may be compared.

Referring to step 206, the speeds of the target vehicles 30 are displayed. The speeds that are displayed depend on the results of the comparison of step 206. For example, the speeds from the zone (front or rear) that has the greatest speed may be displayed. Or, the speeds from the zone that has the strongest signal may be displayed. As shown in FIG. 9, the speeds for two vehicles may be shown on the display 16. For example, the speed of a target vehicle 30 having the strongest signal may be shown in the second speed indication 52, and the speed of a target vehicle 30 having the greatest speed may be shown in the third speed indication 54. In addition, the speed of the patrol vehicle 28 is also displayed.

After the completion of step 206, steps 201-206 may be repeated at a rate of 4-5 Hz.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A traffic radar system comprising:
a first radar transceiver assembly configured to transmit and receive radar beams from a front zone corresponding to an area in front of a patrol vehicle and to generate a first electronic signal corresponding to the received radar beam;
a second radar transceiver assembly configured to transmit and receive radar beams from a rear zone corresponding to an area behind the patrol vehicle and to generate a second electronic signal corresponding to the received radar beam;
a display configured to display a plurality of speeds, each speed being a speed of a target vehicle; and
a processing element configured to receive the first and second electronic signals,
process the first electronic signal to determine speeds of at least one target vehicle in the front zone,
process the second electronic signal to determine speeds of at least one target vehicles in the rear zone,
control the display to display the speeds of the target vehicles in the front zone or the target vehicles in the rear zone based on predetermined parameters, and
control the display to display a first speed of the target vehicle with the fastest speed and a second speed of the target vehicle whose reflected radar beam had the greatest magnitude.

2. The traffic radar system of claim 1, further comprising:
an analog to digital converter configured to receive the first electronic signal and the second electronic signal and output a plurality of front radar digital data samples and a plurality of rear radar digital samples.

3. The traffic radar system of claim 2, wherein the first electronic signal received by the processing element includes front radar digital data samples and the processing element is configured to perform a time domain to frequency domain conversion on the front radar digital data samples to determine the speeds of the target vehicles in the front zone.

4. The traffic radar system of claim 2, wherein the second electronic signal received by the processing element includes rear radar digital data samples and the processing element is configured to perform a time domain to frequency domain conversion on the rear radar digital data samples to determine the speeds of the target vehicles in the rear zone.

5. The traffic radar system of claim 1, wherein the processing element is further configured to control the display to display an indicia indicating whether speeds of the target vehicles in the front zone or speeds of the target vehicles in the rear zone are being displayed.

6. The traffic radar system of claim 1, wherein the processing element is further configured to generate Doppler audio output corresponding to the zone from which the speeds of the target vehicles are being displayed.

7. The traffic radar system of claim 1, wherein the processing element is further configured to control the display to display a speed of the patrol vehicle.

8. A traffic radar system comprising:
a first radar transceiver assembly configured to transmit and receive radar beams from a front zone corresponding to an area in front of a patrol vehicle and to generate a first electronic signal corresponding to the received radar beam;
a second radar transceiver assembly configured to transmit and receive radar beams from a rear zone corresponding to an area behind the patrol vehicle and to generate a second electronic signal corresponding to the received radar beam;
a display configured to display a plurality of speeds, each speed being a speed of a target vehicle;
an analog to digital converter configured to receive the first electronic signal and the second electronic signal and output a plurality of front radar digital data samples and a plurality of rear radar digital samples; and
a processing element configured to receive the front radar digital data samples and the rear radar digital data samples, perform a time domain to frequency domain conversion on the front radar digital data samples to determine speeds of at least one target vehicles in the front zone, perform a time domain to frequency domain conversion on the rear radar digital data samples to determine speeds of at least one target vehicles in the rear zone, control the display to display the speeds of the target vehicles in the front zone or the target vehicles in the rear zone based on predetermined parameters, and control the display to display a first speed of the target vehicle with the fastest speed and a second speed of the target vehicle whose reflected radar beam had the greatest magnitude.

9. The traffic radar system of claim 8, wherein the processing element is further configured to control the display to display an indicia indicating whether speeds of the target vehicles in the front zone or speeds of the target vehicles in the rear zone are being displayed.

10. The traffic radar system of claim 8, wherein the processing element is further configured to generate Doppler audio output corresponding to the zone from which the speeds of the target vehicles are being displayed.

11. The traffic radar system of claim 8, wherein the processing element is further configured to control the display to display a speed of the patrol vehicle.

12. A computer-implemented method for displaying speeds of target vehicles, the method comprising:

buffering a plurality of front radar digital data samples;

processing the front radar digital data samples to determine speeds of at least one target vehicles in a front zone corresponding to an area in front of a patrol vehicle;

buffering a plurality of rear radar digital data samples;

processing the rear radar digital data samples to determine speeds of at least one target vehicles in a rear zone corresponding to an area behind the patrol vehicle;

comparing the speeds of the target vehicles in the front zone with the speeds of the target vehicles in the rear zone;

displaying the speeds of the target vehicles in the front zone or the target vehicles in the rear zone based on predetermined parameters; and displaying a first speed of the target vehicle with the fastest speed and a second speed of the target vehicle whose reflected radar beam had the greatest magnitude.

13. The computer-implemented method of claim 12, wherein processing the front radar digital data samples includes performing a time domain to frequency domain conversion on the front radar digital data samples to determine speeds of the target vehicles in the front zone.

14. The computer-implemented method of claim 12, wherein processing the rear radar digital data samples includes performing a time domain to frequency domain conversion on the rear radar digital data samples to determine speeds of the target vehicles in the rear zone.

15. The computer-implemented method of claim 12, further comprising displaying an indicia indicating whether speeds of the target vehicles in the front zone or speeds of the target vehicles in the rear zone are being displayed.

16. The computer-implemented method of claim 12, further comprising displaying a speed of the patrol vehicle.

17. The computer-implemented method of claim 12, further comprising generating Doppler audio output corresponding to the zone from which the speeds of the target vehicles are being displayed.

* * * * *